United States Patent
Krusinski et al.

(10) Patent No.: US 8,328,502 B2
(45) Date of Patent: Dec. 11, 2012

(54) TORQUE CONVERTER HAVING STATOR WITH CAST-IN SIDE PLATE

(75) Inventors: Eric Krusinski, Copley, OH (US); David Avins, Burbank, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1072 days.

(21) Appl. No.: 12/220,823

(22) Filed: Jul. 29, 2008

(65) Prior Publication Data

US 2009/0041579 A1 Feb. 12, 2009

Related U.S. Application Data

(60) Provisional application No. 60/962,700, filed on Jul. 31, 2007.

(51) Int. Cl.
| | |
|---|---|
| F01D 15/12 | (2006.01) |
| F03D 11/02 | (2006.01) |
| F04D 29/44 | (2006.01) |
| B63H 1/16 | (2006.01) |
| B64C 11/00 | (2006.01) |

(52) U.S. Cl. ..... 415/123; 415/191; 415/200; 415/208.2; 416/180; 416/197 C

(58) Field of Classification Search ............... 415/189, 415/209.3, 191, 209.4, 222, 210.1, 214 A, 415/214 R, 200, 208.2, 104, 53.1, 123, 230, 415/111, 915; 416/180, 197 C, 191, 244 R, 416/187, 223 B, 178, 241 A
See application file for complete search history.

(56) References Cited

U.S. PATENT DOCUMENTS

| | | | |
|---|---|---|---|
| 5,199,541 A * | 4/1993 | Tobyama et al. | 192/84.941 |
| 5,431,536 A | 7/1995 | By et al. | |
| 5,655,875 A | 8/1997 | Sekine | |
| 2007/0224042 A1* | 9/2007 | Brees et al. | 415/208.2 |

* cited by examiner

*Primary Examiner* — Chuong A. Luu
(74) *Attorney, Agent, or Firm* — Davidson, Davidson & Kappel, LLC

(57) ABSTRACT

A method for manufacturing a torque converter includes providing an outer race of a one way clutch, contacting the outer race with a side plate, and casting a stator housing together with the outer race and the side plate. A torque converter is also provided.

4 Claims, 3 Drawing Sheets

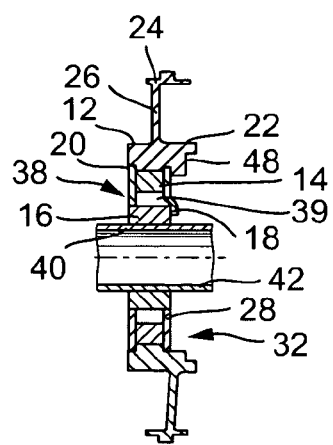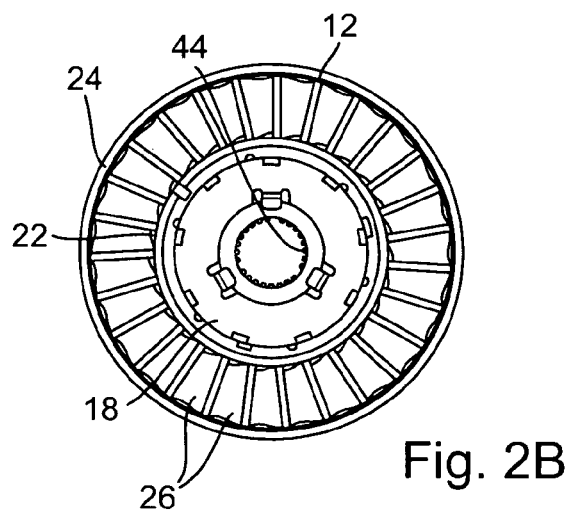
Fig. 2A    Fig. 2B
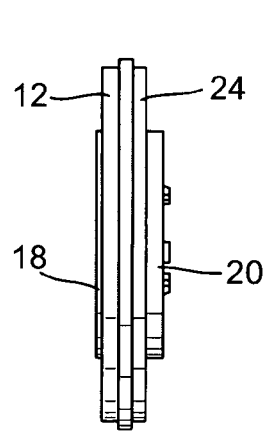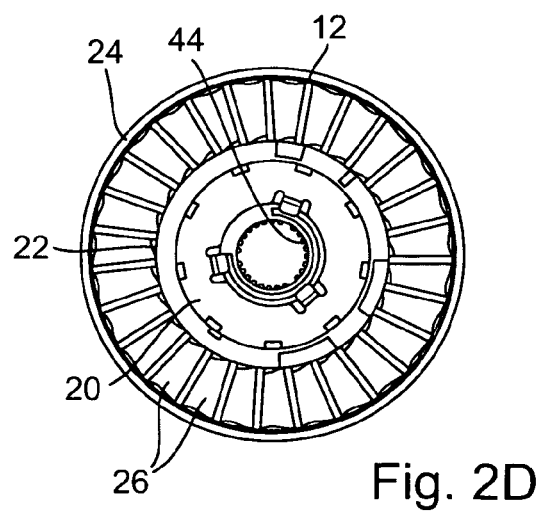
Fig. 2C    Fig. 2D

TORQUE CONVERTER HAVING STATOR WITH CAST-IN SIDE PLATE

Priority to U.S. Provisional Patent Application Ser. No. 60/962,700, filed Jul. 31, 2007, is claimed, the entire disclosure of which is hereby incorporated by reference herein.

The present invention relates generally to hydraulic torque converters, and more particularly to hydraulic torque converters with one-way clutches.

BACKGROUND OF THE INVENTION

The established state of the art for a torque converter stator assembly includes a cast aluminum stator housing, a one-way clutch outer race, a one-way clutch inner race, engaging elements such as rollers or sprags between the outer race and inner race, and side plates or retainer plates to retain the one-way clutch in the assembly. Side plates, commonly made of cast aluminum or steel, are typically attached to the stator housing after the casting process and after the one-way clutch has been assembled.

The outer race is typically pressed into the aluminum housing but it may also be put into the aluminum during the casting process. U.S. Pat. Nos. 5,655,875 and 5,431,536 show molded stator hubs with molded outer races. U.S. Pat. Nos. 5,431,536 and 5,655,875 are hereby incorporated by reference herein.

SUMMARY OF THE INVENTION

The present invention provides a method for manufacturing a torque converter comprising providing an outer race of a one way clutch, contacting the outer race with a side plate, and casting a stator housing together with the outer race and the side plate.

Casting of the stator housing with the outer race and side plate advantageously can reduce an assembly step and improve one-way clutch wear.

The present invention also provides a torque converter comprising a cast stator housing having a groove, a one-way clutch having an outer race connected to the stator housing, and a side plate located at least partially in the groove.

BRIEF DESCRIPTION OF THE DRAWINGS

One embodiment of the present invention is shown with respect to the drawings in which:

FIGS. 2A, 2B, 2C, and 2D show a stator assembly in accordance with one embodiment of the present invention, and show a cross-sectional view, an end view, a side view and a further end view, respectively;

DETAILED DESCRIPTION

Figure 1:
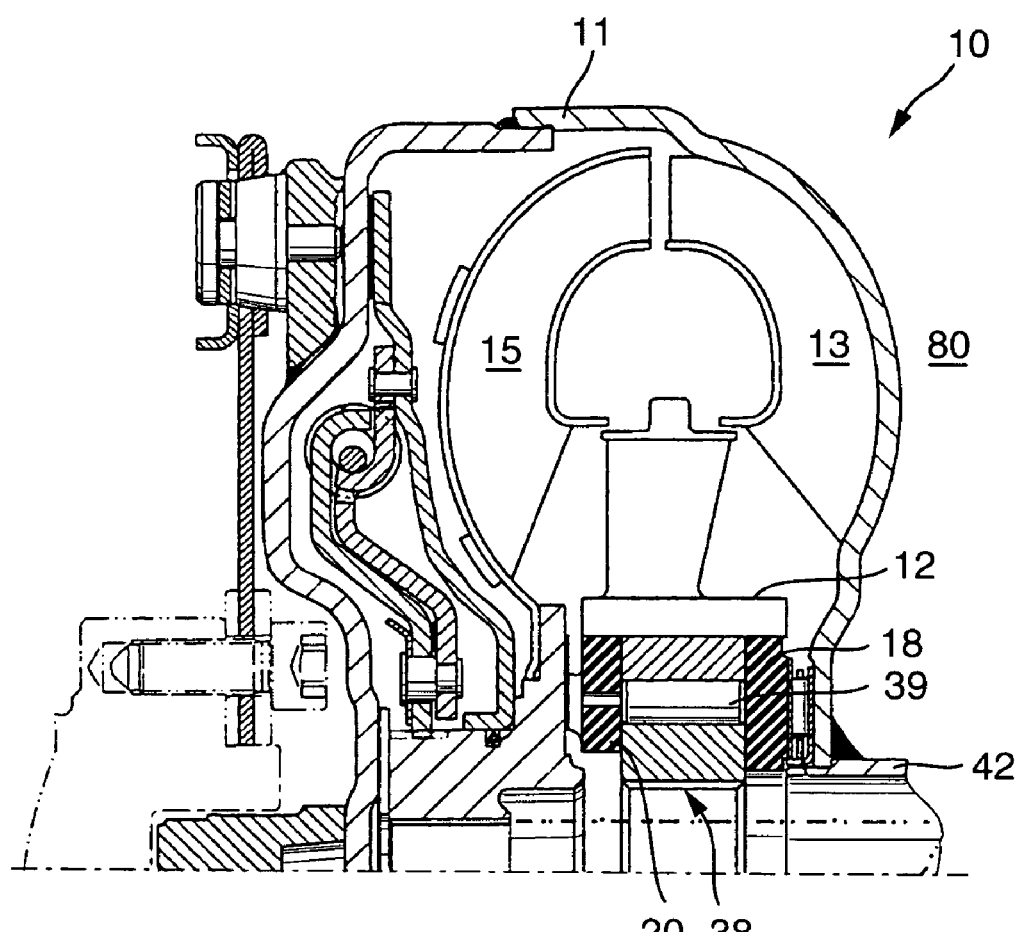
FIG. 1 shows a torque converter according to the present invention.

FIG. 1 describes a torque converter 10 according to the present invention, having a torque converter housing 11, a pump 13, a turbine 15, a stator housing 12, a one-way clutch 38 having engaging elements 39, two side plates 18, 20, and a stator shaft 42 at an output side 80.

FIGS. 2A, 2B, 2C, 2D show details of stator housing 12 and one-way clutch 38 with engaging elements 39. One way clutch 38 has an outer race 14, an inner race 16, and side plates 18 and 20. Stator housing 12 has an inner rim 22, an outer rim 24, and a plurality of blades 26 formed between the inner and outer rims 22, 24. Stator housing 12 is cast of aluminum or some other metal or solid material and outer race 14 together with side plate 18 is embedded into stator housing 12 during the casting process. The other side plate 20 can be attached after the casting process.

An inner radial surface 40 of inner race 16 can be non-rotatably connected to a stator shaft 42 with, for example, splines 44.

By casting side plate 18 into housing 12 at the same time outer race 14 is cast into housing 12, side plate 18 shields inner surfaces 34 of outer race 14 from aluminum contamination since outer race 14 is not adjacent to cast aluminum surfaces of stator housing 12. Also, side plate 18 need not be separately attached, reducing an assembly step.

Figure 3:
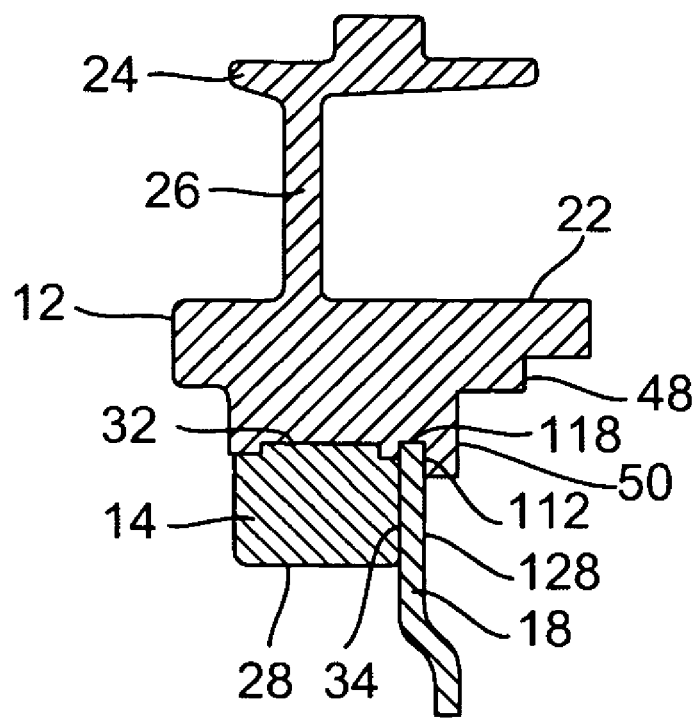
FIG. 3 is a closer sectional view of a stator assembly embodiment of the present invention with a cast-in outer race and side plate.

As shown in more detail in FIG. 3, side plate 18 is attached to housing 12 during the casting process. Side plate 18 is located between outer race 14 and a flange 50, so that an outer circumferential surface 118 is located within a groove 112 of cast stator housing 12. Side plate 18 preferably can be made of stamped steel or can be made of cast aluminum, but is in any event a separate piece.

Side plate 20 is attached after casting and may be made of the same material and have the same shape as side plate 18. Outer race 14 and side plate 18 are positioned adjacent to one another, and inner axial surface 28 of side plate 18 is smooth. An axial outer surface 128 of side plate 18 can contact stator housing 12 at an inner side of flange 50.

Figure 4:
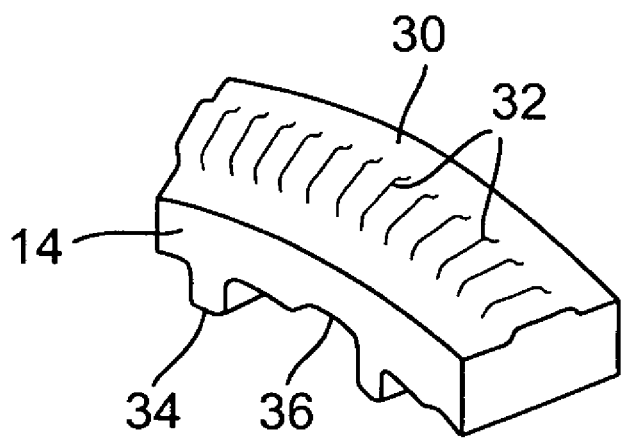
FIG. 4 shows a section of the outer race of the stator assembly.

FIG. 4 shows inner radial surface 34 of outer race 14 with pockets 36. After one-way clutch 38 has been assembled, each pocket 36 of inner surface 34 may contain the engaging elements such as rollers or sprags, further retained by inner race 16 and side plates 18, 20, as shown in FIG. 1.

One-way clutch 38 allows stator housing 12 to rotate around stator shaft 42 and inner race 16 in only one direction. Rollers or sprags, between outer race 14 and inner race 16, oppose rotation in the opposite direction by becoming wedged due to friction.

FIG. 4 shows that the outer radial surface 30 of outer race 14 can contain ridges 32 to prevent relative axial and circumferential motion between outer race 14 and stator housing 12.

Side plate 20 may have the same shape and be made of the same material as side plate 18. By making side plate 20 identical to side plate 18, manufacturing costs and complexity are advantageously reduced. Also, both side plates 18, 20 advantageously can be made of stamped steel, although they also may be made of cast aluminum and then be machined to be smooth.

If advantageous for a particular stator design, additional aluminum may be cast onto housing axial exterior surface 48.

What is claimed is:

1. A method for manufacturing a torque converter comprising:
    providing an outer race of a one way clutch;
    contacting the outer race with a side plate, the side plate having a first axial side facing the outer race and a second axial side opposite the outer race; and
    casting a stator housing together with the outer race and the side plate, the stator housing at least partially enclosing the side plate by extending radially on the second axial side.

2. The method as recited in claim 1 wherein the side plate is provided with a smooth inner axial surface.

3. The method as recited in claim 1 further comprising providing ridges on an outer radial surface of the outer race.

4. The method as recited in claim 1 wherein the stator housing has a flange to retain the side plate.

* * * * *